June 8, 1965  A. K. DIETRICH  3,188,542

ELECTRIC POSITION SERVOMECHANISM

Filed Jan. 9, 1963

United States Patent Office 3,188,542
Patented June 8, 1965

3,188,542
ELECTRIC POSITION SERVOMECHANISM
Arnold K. Dietrich, Binghamton, N.Y., assignor to General Precision, Inc., Binghamton, N.Y., a corporation of Delaware
Filed Jan. 9, 1963, Ser. No. 250,285
10 Claims. (Cl. 318—28)

This invention relates to electric position servomechanisms, and more particularly, to an improved position servo utilizing a direct current motor. In the analog computer and automatic control arts, wide use is made of servomechanisms which receive an input signal to control an electric motor to provide an output shaft position which is commensurate with (linearly proportional to, or otherwise) the value of the input signal. It is almost universally desired that such servomechanisms be powerful, efficient, simple and reliable.

In the past most electric motor servomechanisms required to have a frequency response of several cycles per second or more have utilized alternating current induction motors, which are characterized by poor speed regulation, low torque for a given size, and low efficiency. Conventional alternating current servomotors also require a quadrature excitation supply, necessitating a large capacitor or other phase-shifting means if the servomechanism is to be operated from a single-phase power main. Despite such limitations of alternating current induction motors, they have been used extensively in position servomechanisms because electronic and magnetic servo amplifiers capable of driving them have been readily available. Direct current motor servomechanisms have been, in general, limited to elaborate installations where only very low frequency response is required, and where considerable output torques are absolutely necessary. A typical D.C. servosystem of this type might include an electronic-controlled amplidyne generator which is connected to drive a D.C. series motor. The principal reason that D.C. motors have not been used extensively in high performance servomechanisms has been the lack in the prior art of powerful and reliable direct current amplifiers or other control means to control the heavy currents required for D.C. motor control. The present invention utilizes electronic switching with silicon controlled rectifiers to provide the D.C. current control necessary for a D.C. motor position servomechanism.

Figure 1:
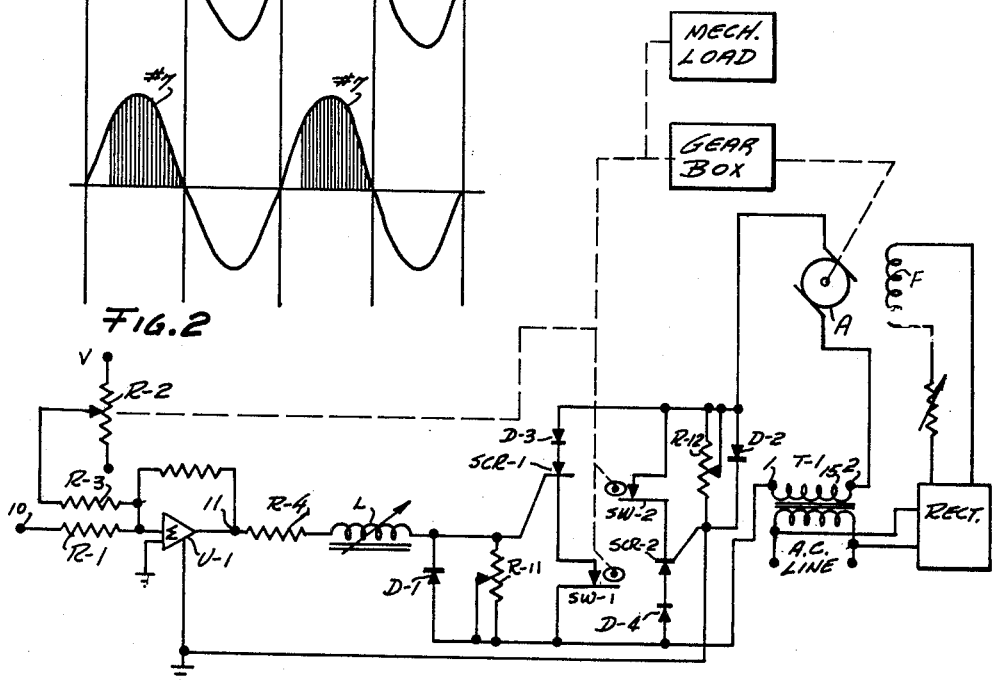
FIGURE 1 is a schematic illustration of the preferred embodiment of the present system.

In the exemplary embodiment shown in FIG. 1, a direct voltage input signal having a polarity commensurate with direction from a reference level is applied via terminal 10 and scaling resistor R-1 to a conventional D.C. summing or operational amplifier U-1, together with a position feedback potential derived by rebalancing potentiometer R-2 and applied via scaling resistor R-3. The output voltage at terminal 11 of amplifier U-1 is connected via resistor R-4 and inductance L to the motor circuit as shown. As in a conventional position servomechanism, the amplifier will provide an output voltage having a polarity and magnitude commensurate with the sense and magnitude of the difference between the input and feedback currents applied to the amplifier, and the motor is controlled by the amplifier output voltage to run until the two amplifier inputs cancel, so that the servomechanism output shaft position is continuously controlled to be a function of the input voltage applied to terminal 10.

In the present invention the armature A of motor M is connected in series with an alternating current supply shown as comprising the secondary winding of transformer T-1, and the shunt field F of the motor is separately excited by a conventional rectifier circuit. Connected in parallel with each other but oppositely-poled, and connected in series with the alternating power source and motor armature A, are a pair of silicon controlled rectifiers SCR-1 and SCR-2 and two diodes D3 and D4. If SCR-1 is caused to conduct during certain portions, of the alternating voltage cycle, it will be seen that pulsating D.C. current will flow through the SCR-1 and D3, transformer T-1 and armature A series loop generally in a counterclockwise manner as shown in FIG. 1. Conversely if SCR-2 and D4 are caused to conduct, pulsating D.C. current will flow through the SCR-2, transformer T-1, armature A series loop in a clockwise direction. Inasmuch as motor field excitation remains in the same direction, it will be seen that firing of SCR-1 will tend to rotate armature A in one direction, while the firing of SCR-2 will tend to cause rotation in the opposite direction. Thus, the output voltage from amplifier U-1 is connected to fire SCR-1 when it is of one polarity and to fire SCR-2 when of opposite polarity. Since an SCR will conduct only when its anode is positive with respect to its cathode, SCR-1 can conduct only during that half-cycle of the alternating voltage when terminal 2 of secondary winding 15 is positive with respect to terminal 1, and SCR-2 can conduct only during the opposite half cycle. The two silicon diodes D3 and D4 are connected in series with SCR-1 and SCR-2 respectively so as to suppress the leakage current of the SCR's during the negative half wave cycle, minimizing motor heating and rendering the system more reliable. The magnitude of the output voltage at terminal 11 of amplifier U-1 determines the percentage of time during a given half-cycle that either SCR will conduct, thereby determining average armature current, motor torque and motor speed. If the system position error is large, so that a relatively large amplified error voltage exists at terminal 11, the SCR which fires will fire earlier during its respective half-cycle than if the error voltage is small, thereby providing greater average current through the motor.

The time during a given half-cycle that an SCR is caused to fire or conduct is controlled by the potential applied to the SCR control or "gate" lead. In order for an SCR to fire, its gate lead must be positive with respect to the SCR cathode as well as the SCR anode being positive with respect to the cathode. If the output potential at terminal 11 is positive, the control current flows through resistor R-4 and inductor L, through resistance R-11, secondary winding 15, motor armature A and forward-biased diode D-2 to ground, causing a voltage drop across resistance R-11 which makes the SCR-1 gate lead positive with respect to the cathode. If the output potential at terminal 11 is negative, control current flows from ground through resistance R-12, armature A and secondary winding 15, forward-biased diode D-1, inductor L and resistance R-4 to terminal 11, thereby causing a drop across R-12 to make the SCR-2 gate lead positive with respect to the SCR-2 cathode. Irrespective of the sense of the error signal and the direction of the control current, it will be seen that the control current comprises an alternating component due to the alternating voltage $E_t$ across secondary winding 15 superimposed upon a direct component commensurate with the sum of $E_c$ (the amplifier output voltage) and $E_m$, the counter E.M.F. of the motor. If the servo is balanced, and at rest, so that no amplified error signal is present at terminal 11 and the motor C.E.M.F. is zero, the D.C. component of the control current is zero, of course, and the entire control current exists due to the alternating voltage from secondary winding 15. Provision of inductance L causes the alternating component of the control current to lag approximately 90 degrees behind the alternating voltage $E_t$, as indicated by waveform #2 of FIG. 2. Inasmuch as the control current flowing through resistor R-11 or resistor R-12 determines the gate lead voltages, waveform #2 also may be considered to illustrate successively and alternately the positive portions of the two gate lead voltages. For example, when waveform #2 is positive with respect to the base line, resistor R-11 is applying a proportional positive voltage to the gate lead of SCR-1, and when waveform #2 is negative with respect to the base line, resistor R-12 is applying a proportional positive voltage to the gate lead of SCR-2. Under opposite conditions diodes D-1 and D-2 by-pass resistances R-11 and R-12, making the gate lead voltages zero. Dashed lines #3 and #4 in FIG. 2 indicate approximately the gate lead signal levels which are necessary to fire SCR-1 and SCR-2, respectively, and thus it will be seen that in the absence of a direct component in the control current, the peak gate lead voltages developed by R-11 and R-12 are just insufficient to fire either SCR.

Figure 2:
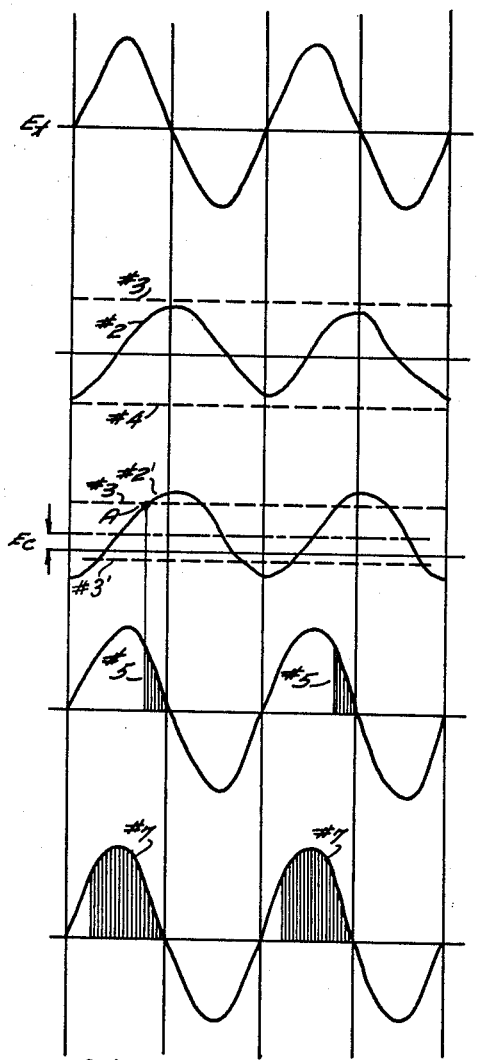
FIGURE 2 depicts the waveforms and voltages present in the operation of the system of the present invention.

Two complete cycles of the voltage $E_t$ across secondary winding 15 of transformer T-1 are shown plotted in FIG. 2. During the first half (0–180°) of each cycle terminal 2 of winding 15 is positive with respect to terminal 1, and hence it is possible for SCR-1 to fire during these half-cycles but not possible for SCR-2 to fire. During the second halves of each cycle the opposite suitation exists. If the amplifier U-1 output voltage and the motor counter E.M.F. are both zero, so that neither gate lead voltage reaches firing level, neither SCR will fire at all.

Now, however, assume that a different, increased negative input voltage is applied to terminal 10, so that a positive output voltage $E_c$ exists at terminal 11. The direct voltage $E_c$ will be seen to bias or shift the alternating component of the control current, as shown by waveform #2' in FIG. 2, so that the gate lead voltage now will exceed the firing level indicated by dashed line #3, and as soon as the gate lead voltage does exceed the firing level, as indicated at point A in FIG. 2, SCR-1 will conduct. Once SCR-1 conducts the gate lead voltage essentially loses control, and SCR-1 will conduct for the remainder of the 0–180° half-cycle, as indicated by the shaded portions #5 in FIG. 2, until the SCR anode-cathode voltage is reversed at the 180 degree point. If the control voltage $E_c$ is even more positive, so that waveform #2 were to lie above the gate lead firing level during most of each cycle, as indicated by dashed line #3' in FIG. 2, it will be seen that SCR-1 will conduct for a greater portion of each 0–180 degree half-cycle, as indicated by shaded portions #7 in FIG. 2, resulting in greater average armature current and greater motor torque. If the control voltage ($E_c+E_m$) reaches the peak value of the alternating component of the gate lead voltage waveform #2, the SCR will conduct throughout all 180 degrees of its conduction half-cycle. Thus, it will be seen that the conduction angle may be varied between zero and 180 degrees by variation of the control voltage ($E_c+E_m$). Inasmuch as the SCR-2 circuit is identical to the SCR-1 circuit and merely oppositely-poled, it will be apparent without further explanation that increasingly negative amplified error voltages at terminal 11 will cause SCR-2 to conduct for increasing portions of the 180–360 degree half-cycles. Inasmuch as the motor counter E.M.F. voltage across armature A is connected directly in series with the amplifier output voltage, the D.C. component of the control current is directly added algebraically to the amplifier output voltage, providing rate feedback without the need for an auxiliary tachometer generator. As current pulses are applied to the motor it will accelerate until the motor counter E.M.F. substantially equals the amplifier output voltage. If the counter E.M.F. exactly equals the amplifier output voltage the condition illustrated by waveform #2 obtains, so that neither SCR will fire. If the motor slows down, because of friction, for example, the imbalance between $E_c$ and $E_m$ will shift the gate lead alternating voltage component in a direction to cause that SCR to fire which will increase motor speed. If the motor tends to overspeed, because of load inertia, for example, the resulting imbalance between $E_c$ and $E_m$ will cause the other SCR to fire, thereby reducing motor speed.

Thus, it will be seen that the motor is continuously caused to run at a speed proportional to the amplified error voltage $E_c$, and because appreciable loop gain may be provided, the linearity of the speed response is excellent even though the gating voltage variation with input signal is sinusoidal rather than linear. If a step function command signal is applied to input terminal 10, the amplifier output signal will decrease exponentially, as the servo moves toward a new balanced position.

In order that the servo have minimum "deadband," i.e., that it respond to small input signals, the gate lead firing voltage levels (dashed lines #3 and #4 in FIG. 2) must be set substantially at the peak values of waveform #2. This may be accomplished easily by adjustment of the values of resistors R-11 and R-12. If these resistances are too large, the gate lead voltages will exceed their firing levels even when the direct component is zero, resulting in firing of both SCR-1 and SCR-2 on successive half-cycles, tending to oscillate the motor at the frequency of the alternating supply and causing the motor to overheat. If these resistances are too low, an undesirably wide deadband will exist, usually undesirably decreasing the positional accuracy of the servomechanism. A slight deadband usually will be desired to avoid SCR firing from noise or hum voltages. The circuit has the advantage that resistances R-11 and R-12 may be adjusted independently of each other, thereby enabling one to set the deadband symmetrically or unsymmetrically as one desires.

While the system explained above assumed that rebalancing potentiometer R-2 has a linear voltage versus rotation characteristic, it should be noted that various non-linear feedback voltage deriving devices may be substituted in accordance with known techniques to provide desired forms of operation. For example, potentiometer R-2 could be provided with a square function characteristic, so that the servo output shaft position would be commensurate with the square root of the command input signal. Also, while the system shown in detail illustrates the use of an electrical command signal, it will be apparent that a mechanical input signal may be substituted, such as a mechanical input connected to displace the winding of potentiometer R-2.

In most position servomechanisms, mechanical slip clutches are attached to the servo output shaft and diode limiter circuits operated by limit switches driven by the motor are used to prevent the servo from driving beyond certain limits in either direction in order to avoid damaging potentiometers or other devices driven by the servomechanism. Because such diode limiters are low current devices they are required to operate upon the servoamplifier input signal, where low signal levels exist, rather than upon the amplifier output signal. Since the servo must be backed away from a limit position to resume operation, it is not feasible to completely disable the servo when it reaches a position limit, and hence prior art diode circuits which prevent operation past a limit while allowing operation back from a limit sometimes are complex and expensive. Such prior circuits have the further great disadvantage that they depend upon the servo amplifier, and if a fault or failure in the servo amplifier causes it to put out a large signal rather than no signal, diode limiter circuits which operate upon the amplifier input signal do not prevent the servo from damaging itself. In the present invention a pair of cam-operated switches SW-1 and SW-2 are connected directly in series with SCR-1 and SCR-2, respectively.

A cam on the servo output shaft opens SW–1 if one position limit is reached and opens SW–2 if the opposite position limit is reached. It will be seen that the opening of one limit switch still allows the servo to be backed away from the limit position. It may be further noted that even if amplifier U–1 failure causes a continuous output voltage, the limit switches prevent the motor from operating past the limit stops.

It will thus be seen that the object set forth above, among those made apparent from the preceding description, are efficiently attained and, since certain changes may be made in the above article without departing from the scope of the invention, it is intended that all matter contained in the above description (and shown in the accompanying drawing) shall be interpreted as illustrative and not in a limiting sense.

I claim:

1. A position servomechanism, comprising in combination: a source of alternating current; a direct current motor having an armature and a separately-excited shunt field; first and second semi-conductor controlled rectifiers each having an anode, a cathode and a gate terminal, the anode-cathode circuits of said controlled rectifiers being connected oppositely-poled in parallel between a pair of conductors; said source, said armature and said pair of conductors being connected in a series loop; first and second impedances connected respectively between said cathode and said gate terminal of said controlled rectifiers; a direct-coupled servoamplifier having an input circuit and a pair of output terminals; a reactance element; circuit means connected said first impedance, said amplifier output terminals, said reactance element and said second impedance element in series between said pair of conductors; and means mechanically operated by rotation of said armature for applying an input signal to said input circuit of said amplifier.

2. A servomechanism according to claim 1 having first and second diodes connected oppositely-poled and in parallel, respectively, with said first and second impedances.

3. A position servomechanism, comprising, in combination: a source of alternating current of constant amplitude; a direct current motor having an armature and a separately-excited shunt field; first and second semi-conductor controlled rectifiers each having an anode, a cathode and a gate terminal, the anode-cathode circuits of said controlled rectifiers being connected oppositely-poled in parallel between a pair of conductors; said source said armature and said pair of conductors being connected in a series loop; first and second impedances connected respectively between said cathode and said gate terminal of each of said controlled rectifiers; a control current circuit connected to apply a control current through said impedances to control the gate terminal-to-cathode voltages of said rectifiers, said control current circuit including means for superimposing said alternating current of constant amplitude and a direct current of varying magnitude and polarity; a direct-coupled servoamplifier operable to receive an input signal and to provide an amplified output signal, said amplified output signal being connected to further vary said direct current; means including a feedback voltage-deriving means operated by movement of said armature for applying an input signal to said servoamplifier; and a load mechanically connected to be operated by rotation of said armature.

4. A servomechanism according to claim 2 including third and fourth diodes connected in series with said first and second impedances, respectively.

5. A servomechanism according to claim 3 including first and second semiconductor means connected in series with said first and second rectifiers, respectively, poled for current conduction in the same direction as the connected one of said first and second rectifiers to prevent the conduction of leakage current through said rectifiers.

6. An electric position servomechanism comprising: a direct current servomotor; a source of alternating potential; first and second controlled rectifiers each including at least one gate terminal; first circuit means coupling said direct current servomotor, said source of alternating potential and said first controlled rectifier electrically in series, with said first controlled rectifier poled to conduct current in a first direction; second circuit means coupling said direct current servomotor, said source of alternating potential and said second controlled rectifier electrically in series, with said second controlled rectifier poled to conduct current in a second direction; an amplifier for providing at an output terminal an output signal, the polarity and magnitude of which is determined by the polarity and magnitude of an applied input signal; and means coupling said output signal to said at least one gate terminal of said first and second controlled rectifiers, the polarity of said output signal enabling one of said first and second controlled rectifiers for conduction and the magnitude of said output signal determining the time interval of conduction of said enabled controlled rectifier.

7. The servomechanism of claim 6 including means mechanically operated by rotation of said servomotor for applying a further signal to said amplifier, in combination with said input signal, tending to reduce the magnitude of said input signal.

8. The servomechanism of claim 7 further including first and second switch means; third circuit means connecting said first switch means electrically in series with said first controlled rectifier and said second switch means electrically in series with said second controlled rectifier; and mechanical means coupled to said direct current servomotor for opening said first switch means when a first predetermined limit position is reached by said servomotor and for opening said second switch means when a second predetermined limit position is reached by said servomotor.

9. An electric position servomechanism comprising, first and second controlled rectifiers each including an anode, cathode, and gate terminal, first and second diodes each including an anode and a cathode, and first and second resistors; first circuit means connecting said first and second controlled rectifiers oppositely-poled in parallel; second circuit means connecting said first resistor and said first diode between said cathode and gate terminals of said first controlled rectifier and said second resistor and said second diode between said cathode and gate terminals of said second controlled rectifier, respectively, each of said first and second diodes being oppositely-poled with respect to the polarity of its associated controlled rectifier, the cathode and gate terminals of which it is connected between; a direct current motor having at least an armature and a shunt field; a first source of constant alternating potential; third circuit means electrically connecting said armature and said first source in series with said anodes of said first and second diodes; a second source of bipolar varying potential; and fourth circuit means coupling said second source to said gate terminals of said first and second controlled rectifiers, whereby said first and second sources in combination determine the one of, and the time interval during which, said first and second controlled rectifiers apply a direct current potential to said armature of said direct current motor.

10. The servomechanism of claim 9 including third and fourth diodes; and fifth circuit means connecting said third and fourth diodes electrically in series with said first and second controlled rectifiers, respectively each of said third and fourth diodes being similarly-poled with respect to the polarity of the controlled rectifier with which it is connected in series.

References Cited by the Examiner
UNITED STATES PATENTS

| | | | |
|---|---|---|---|
| 2,977,523 | 3/61 | Cockrell | 318—345 |
| 3,050,672 | 8/62 | Alexanderson | 318—257 |
| 3,095,534 | 6/63 | Cockrell | 318—345 |
| 3,109,971 | 11/63 | Welch et al. | 318—30 |
| 3,119,957 | 1/64 | Alexanderson | 318—257 |

OTHER REFERENCES

Publication: Controlled Rectifiers Drive A.C. and D.C. Motors, by W. R. Seegmuller, from November 3, 1959, issue of "Electronics."

JOHN F. COUCH, *Primary Examiner.*